United States Patent Office 3,440,686
Patented Apr. 29, 1969

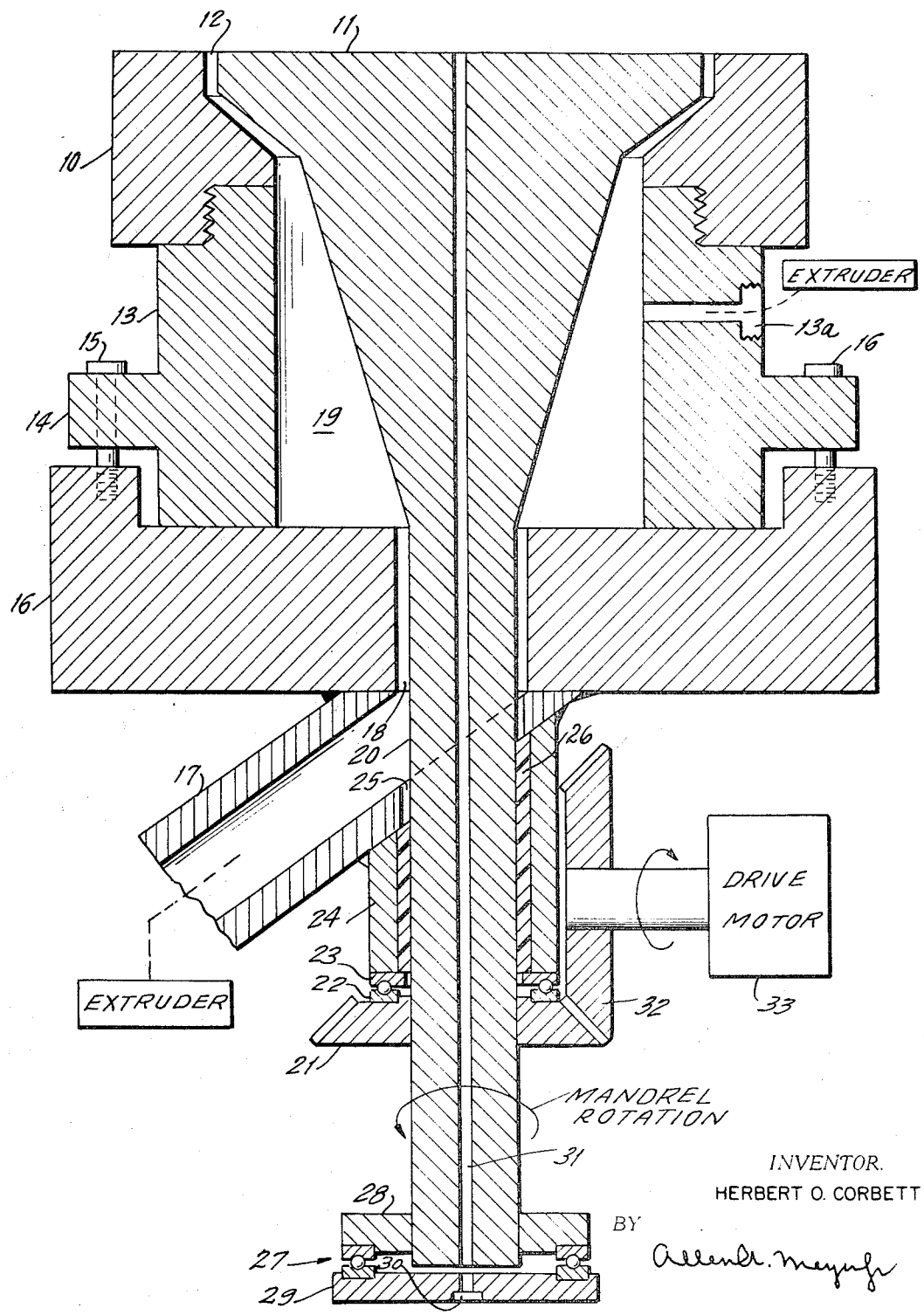

3,440,686
EXTRUSION DIE HAVING ANGULARLY MOVING CENTRAL MANDREL
Herbert O. Corbett, Bridgeport, Conn., assignor to National Distillers and Chemical Corporation, New York, N.Y., a corporation of Virginia
Filed Dec. 29, 1966, Ser. No. 605,694
Int. Cl. B29d 23/04
U.S. Cl. 18—14              5 Claims

ABSTRACT OF THE DISCLOSURE

An extrusion die for blown plastic film having an angularly moving central mandrel to distribute gauge bands around the periphery of the blown tube.

---

This invention relates to extrusion dies for the extrusion of blown plastic film, and more specifically relates to an extrusion die having a central mandrel defining the interior of the circular discharge orifice which rotates or oscillates about its axis to distribute gauge bands around the periphery of the extruded plastic tube.

It is well known that gauge bands, longitudinal or strips of increased thickness are formed in tubular film extruded through a narrow, circular discharge orifice. Such gauge bands upset the "roll geometry" of the tubular film subsequently wound in roll form since the increase width bands fall on top of one another as the roll is wound. This poor roll geometry also results in stretching the film adjacent the increased thickness, or "hard spots" in the roll, causing the film to be "bellied" when it is unwound.

To avoid the undesirable results of gauge bands, it is common practice to rotate the entire die, or the outer section thereof. This causes the gauge bands to, in effect, rotate around the tube being formed so that the gauge bands in the roll do not lie atop one another, but are displaced over the full roll width.

The principle of the present invention is to "rotate" gauge bands around the tube being extruded by angularly moving the central section, or central mandrel of the die discharge orifice. In this manner, the gauge band or bands will move angularly around the film with respect to fixed portions of the die structure. Moreover, by rotating the central mandrel, problems of sealing against the relatively high pressure extrudate are simplified since only one annular region surrounding the central mandrel need be provided.

Accordingly, a primary object of this invention is to distribute gauge bands of a blown tubular film by rotating a central portion of the die.

Another object of this invention is to provide a novel die structure for distributing gauge bands of a tubular blown plastic film which requires relatively simple sealing means.

These and other objects of this invention will become apparent from the following description of the drawings which shows a typical plastic extrusion die for blown plastic film in cross section.

The die of the drawing comprises an outer die orifice cap 10 which cooperates with a central mandrel 11 to define a circular discharge orifice 12 through which a tubular film of any desired plastic may be extruded. Cap 10 is threaded on outer die body 13 which has a flange 14 extending therefrom. A ring of bolts, such as bolts 15 and 16, pass through flange 14 and are threaded into lower body 16 to hold the end of outer die body 13 securely in place on body 16. Usual gaskets, not shown, are provided to form a high pressure seal between bodies 13 and 16.

A wedge cut tube 17 extending from a suitable extruder, schematically shown, which forces a flow of molten plastic under high pressure through conduit 18 in body 16, into annular chamber 19, and to discharge orifice 12. If desired, a conduit 13a may be provided in body 13, which is connected to an extruder source for forming a laminated tubular product in the well known manner. A tube of the plastic material is then extruded from orifice 12 which is supported by air injected into the interior of the tube as will be later described, and the molten tube is solidified, collapsed by a pair of overhead nip rolls, and wound on a storage roll.

In accordance with the invention, central mandrel 11 is given an angular motion, such as rotation or oscillation, in order to angularly displace the location of such gauge bands as the tube is extruded from discharge orifice 12. Thus mandrel 11 has an elongated stem 20 which is suitably connected, as by welding, to bevel gear 21. Bevel gear 21 carries the lower race 22 of a thrust bearing. The upper race 23 of the thrust bearing is fastened to a cylindrical bronze bushing 24 which is welded around an opening 25 in tube 17. A sleeve 26 of Teflon is then tightly fitted in the annular volume between bushing 24 and stem 20 to seal the opening 25 around stem 20.

A second thrust bearing 27 is then provided between flange member 28 at the bottom of stem 20 and fixed support plate 29. Fixed support plate 29 has a connection nipple 30 which receives a source of air pressure and connects this air to central opening 31 in central mandrel 11 to inject air into the tube being blown.

With the mandrel 13 now supported between fixed members 17 and 29, a drive bevel gear 32, driven from drive motor 33 and meshing with gear 21 can now cause central mandrel 11 to rotate (or oscillate) about its central axis. This rotation at discharge orifice 12 will cause the tube being extruded to rotate (or oscillate) about its axis whereby longitudinal gauge bands in the film will, in effect, wind or oscillate around the tube as it is rolled in the subsequently wound roll.

Although this invention has been described with respect to its preferred embodiments, it should be understood that many variations and modifications will now be obvious to those skilled in the art, and it is preferred therefore, that the scope of the invention be limited not by the specific disclosure herein, but only by the appended claims.

The embodiments of the invention in which an exclusive privilege or property is claimed are defined as follows:

1. In an extrusion die for the extrusion of a blown tubular film of plastic material, a fixed outer die body, a central mandrel coaxial with said fixed outer die body, an annular chamber defined between said fixed outer die body and said central mandrel which leads to a circular discharge orifice, a circular opening in the central bottom of said die body coaxial with and communicating with said annular chamber, a conduit connected to said annular chamber, a source of high pressure molten plastic connected to said conduit; said central mandrel having a downwardly extending stem extending through said circular opening; seal means sealing said circular opening; bearing support means connected to said central mandrel and axially fixing said central mandrel and rotatably supporting said central mandrel; angular drive means connected to said stem for moving said stem with angular motion about the axis thereof; a second extruder means and a second conduit connected thereto; said second conduit extending through said fixed outer die body.

2. The extrusion die of claim 1 which includes air conduction channel means longitudinally extending along said central mandrel.

3. The extrusion die of claim 1 wherein said conduit is connected to and sealed around said circular opening; said conduit having an opening therein coaxial with said stem; said seal means comprising a sleeve member extending across an annularly shaped gap between said stem and said opening in said conduit.

4. The extrusion die of claim 3 wherein said central bottom of said die body has a cylindrical bushing extending therefrom coaxial with said stem; said fixed bearing support means including a bearing member connected to the bottom end of said cylindrical bushing; said seal means captured in an annular volume bounded by the interior of said cylindrical bushing, the exterior surface of said mandrel stem and said bearing member.

5. The extrusion die of claim 4 which includes air conduction channel means extending longitudinally along said central mandrel.

References Cited

UNITED STATES PATENTS

| 1,677,808 | 7/1928 | Alassio et al. |
| 2,801,441 | 8/1957 | Wadsworth. |
| 2,896,254 | 7/1959 | Braun. |
| 2,919,467 | 1/1960 | Mercer. |
| 2,957,201 | 10/1960 | Fields et al. |
| 3,349,437 | 10/1967 | Quackenbush. |

FOREIGN PATENTS

| 987,809 | 3/1965 | Great Britain. |

WILLIAM J. STEPHENSON, *Primary Examiner.*